Nov. 22, 1938.  L. G. BROTZMAN  2,137,233
PLANT THINNER
Filed Aug. 25, 1936  2 Sheets-Sheet 2

Inventor:
Leonard G. Brotzman.
by Hazard & Miller
Attorneys.

Patented Nov. 22, 1938

2,137,233

UNITED STATES PATENT OFFICE 2,137,233

PLANT THINNER

Leonard G. Brotzman, Arroyo Grande, Calif.

Application August 25, 1936, Serial No. 97,773

9 Claims. (Cl. 97—22)

My invention is designated a plant thinner as it is designed and intended for use in agricultural field crops to thin out the rows of growing plants to thereby give more room for the proper development of the plants left in the row. There are many types of crop in which the seeds or seedlings are planted in rows and if a large proportion of these germinate, the plants are altogether too thick and therefore require thinning, however in many cases the plants do not grow uniformly in the row, sometimes being close together and other times being quite sparse or spaced apart.

Therefore, an object and feature of my invention is a machine which may be manually controlled and operated in order to drastically thin out the plants where they are altogether too close, to graduate the thinning if only a few plants here and there in a row require thinning and the other places where the plants are already spaced a sufficient distance apart, to entirely eliminate the thinning operation.

A further detail object and feature of my invention is a plant thinning machine which employs a cutter which is operated to cut the plant slightly below the ground surface, hence by completely cutting off the top of the plant, the root system and the plant below the ground is killed, thus properly eliminating certain of the plants for the maturing of those left. In this connection a detail feature of the cutter portion of my invention is in mounting and using a dished type of disc with deep notches or spaces extending from its periphery towards the center. The disc is so mounted with its axis at an inclination to the surface of the ground so that by contact with the ground the disc rotates, the solid portions of the disc engaging and cutting the plants below the ground surface whereas the notches or spaces in the disc miss or straddle other plants which are left to mature. Hence by providing an adjusting device for regulating the size of the notches or spaces, I may control the relative number of plants cut or thinned out in proportion to those which are left for further growing.

Another feature of my invention resides in having a steering device for use in conjunction with the notched disc forming the thinner by which means as the vehicle is moved lengthwise of a row of plants the operator positioned substantially over the rear axle can steer the wheels one way or the other while watching the operation of the thinning disc and therefore can readily follow the plants in a row even if the row is not straight. Another conjoint feature of my invention for use with the thinner is a special adjustable cultivating implement which may be regulated cultivating tools on opposite sides of the row of plants and thereby replace the earth disturbed by the notched disc of the thinner device.

My invention is illustrated in connection with the accompanying drawings, in which:

Figure 4 is an elevation of the thinning disc taken in the direction of the arrow 4 of Figure 5.

Figure 5 is a diametrical section of the thinning disc mounted on the line 5—5 of Figure 4 taken in the direction of the arrows.

Figure 6 is an elevation of a preferred type of thinning disc taken in the direction of the arrow 6 of Figure 7 illustrating part of the disc.

Figure 7 is a diametrical section on the line 7—7 of Figure 6 in the direction of the arrows.

Figure 1:
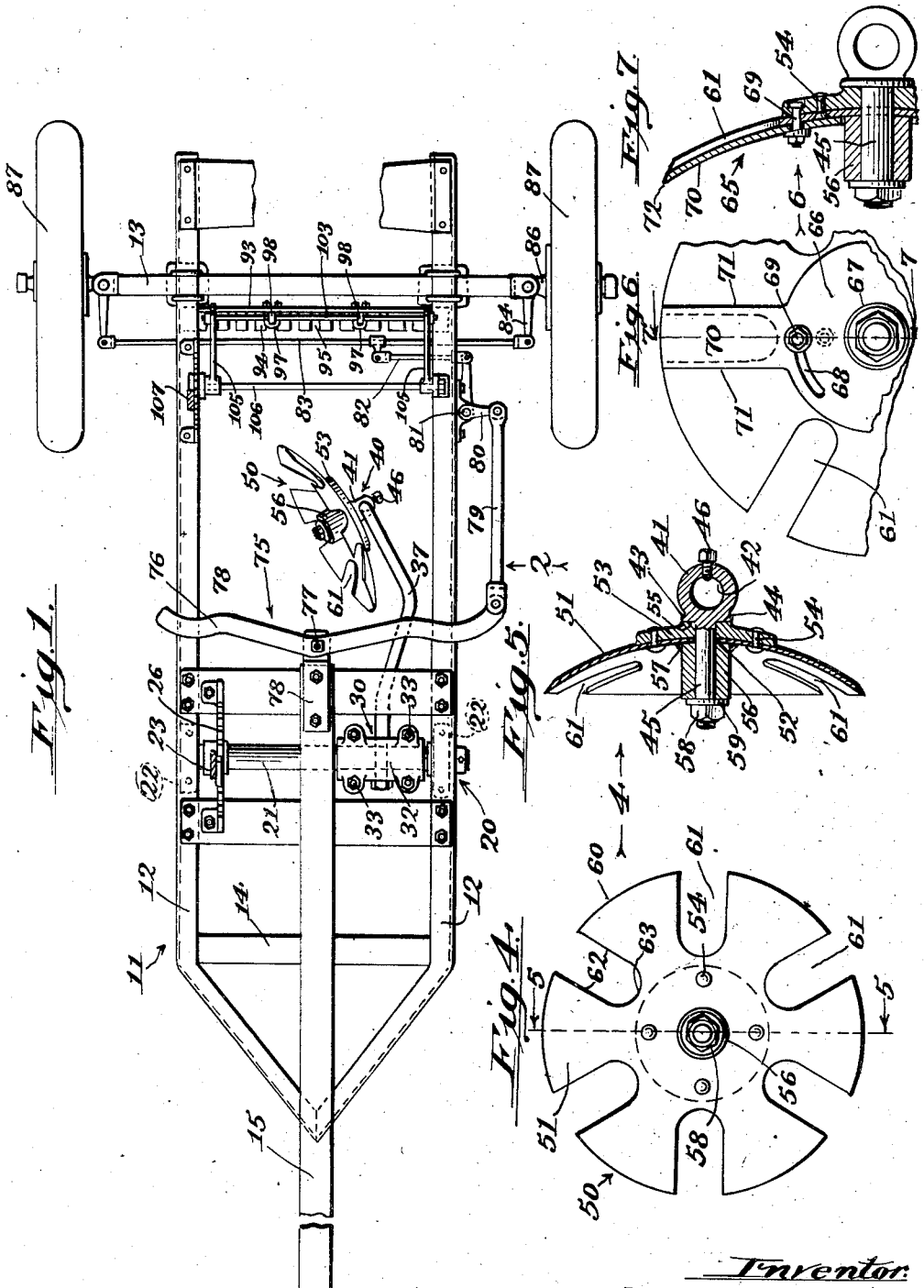
Figure 1 is a plan taken in the direction of the arrow 1 of Figure 2.

In my invention I employ a vehicle frame 11 which is illustrated as having parallel side beams 12 connected adjacent their rear ends to an axle 13. The frame has cross members 14 and a tongue 15 is connected to the frame. If the implement is towed, the tongue may be attached to a tractor and thus the tractor support the front end of the implement or if the device is moved by animal power, these can be hitched to the tongue and thus draw and support the vehicle at its forward end.

The adjustable mounting for the thinner device designated by the assembly numeral 20 employs a transverse rock shaft 21 which is mounted in journals 22 on the opposite sides of the frame, these preferably being connected to the side beams 12. An operating arm 23 is securely attached to the shaft 21. This has a dog 24 pivotally mounted thereon which may be manipulated by the finger grip 25 to engage the dog with any of the teeth of the quadrant 26, this being for the purpose of adjusting the angular position of the shaft 21.

On this shaft there is a substantial clamp 30, this being illustrated as having a block 31 on the lower side and a cap 32 on its upper side, the block and the cap being secured together by a plurality of bolts 33, there being four of these illustrated. Preferably formed integral with the block 31 there is an enlarged downwardly extending boss 34 with a longitudinal opening 35 therethrough and in this boss there is a set screw 36.

A substantial curved arm 37, preferably made in the form of a rod circular in cross section, has its forward end extending through the opening 35 in the boss 34 wherein it is clamped by the set screw 36. This rod may be turned on its axis and adjusted in any angular position.

At the rear end of the rod I provide the journal assembly 40 for the thinning disc hereinunder described. This mounting includes a collar 41 which has a cylindrical bore 42 therethrough and at one side of the collar there is a head 43 with an annular bearing shoulder 44. Extending from the shoulder there is a stub axle 45 (note particularly Figure 5). A set screw 46 extends through the collar so that the rear end portion 47 of the curved arm 37 may extend through the cylindrical bore 42 and be clamped by the set screw 46 at the desired angle to the arm and hence to the clamp 30 on the rock shaft 21.

The thinning implement designated by the numeral 50 has its main portion formed of a dished disc 51 with a central perforation 52. This disc may be made of metal of a quality and type used in disc harrows and disc plows, but for my purpose is usually much larger in diameter. A hub 53 in the form of a ring is curved concave on one side to engage the convex side of the disc adjacent its center, the disc and the hub being secured by rivets 54. The hub has an annular thrust end 55 bearing on the annular thrust surface 44 of the head 43 which is an integral part of the collar 41. On the concave side of the disc there is a secondary hub sleeve 56 which is preferably secured to the disc by an annular weld 57. This sleeve together with the hub 53 with the disc is rotatably mounted on the stub shaft 45. The assembly is held in place by a nut 58 with a washer 59 attached to the outer end of the stub shaft 45.

The cutting portion of the disc is by its periphery 60 which is divided into a series of sections by radial notches 61. These notches preferably have parallel sides 62 and an inner rounded end 63. In operation the peripheral portions cut or thin out the plants and those to be left pass into the notches as the machine operates. The number of notches used depends on the size of the disc.

In my preferred form I employ a regulating device for eliminating the notches and designated by the numeral 65. This employs a small dished ring 66 which has a contour to fit on the large disc 51 and is provided with an opening 67 encircling the hub sleeve 56. The small disc is provided with a concentric slot 68 through which extends a clamping bolt 69 which extends through perforations in the hub plate 53, the disc 51 and the slot 68. A radial closure blade 70 preferably has parallel sides 71 and a concentric outer edge 72, this being of such a size that it completely covers a notch 61. There are a sufficient number of these radial closure blades secured to the small disc 66 to close the desired number of notches 61. For instance, in a disc such as illustrated in Figure 4 with six notches, the small disc 66 may have three radial blades 70, thus forming a cover for alternative notches 61. Thus, when these notches are covered the main disc has a greater thinning action than when the notches are left open. Manifestly the radial blades 70 may be adjusted to completely expose the notches 61 or to close the desired number of notches.

In the operation of the thinning portion of the device, the main disc 51 may be adjusted at the desired angle to the ground level. For instance, the curved arm 37 may be adjusted and clamped in the boss 34, thus changing the angular position of the downwardly extending part 47 of this curved arm 37, such extension fitting in the collar 41 and being secured by the set screw 46. As the machine is pulled in a forward direction the operator sitting in the seat may actuate the operating arm 23 to raise or lower the disc 51 with the assembly of parts connected thereto. As the machine straddles the row of plants to be thinned and the operator can readily observe these plants, he may control the thinning disc for a drastic thinning of plants where these are altogether too thick. In sections of a row where the plants are only slightly too thick, he can control the thinning accordingly and in sections of a row where the plants are spaced a sufficient distance apart, he may raise the disc entirely out of engagement with the ground and thus skip a section of the row. It will therefore be seen that the operator has complete control of the thinning operation in a row of plants.

In order to maintain the thinning disc in the proper position in relation to the plants, I provide a steering mechanism designated by the assembly numeral 75. This employs a foot operated double lever 76 pivoted at 77 to a central part 78 of the frame of the machine. A link 79 extends rearwardly from one end of the lever 76 and is connected to a bell crank 80 pivoted at 81 to one of the side beams 12. A second link 82 is connected to the bell crank, this being pivotally connected to a cross steering link 83 which is pivotally connected to arms 84 on the steering knuckle 85 of the axles 86 on which the wheels 87 are mounted. Therefore, the operator can readily control the position of the machine in reference to a row of plants and may quickly change the course of the machine should the plants deviate from a straight line. The steering mechanism also enables the operator to make a quick turn.

Figure 2:
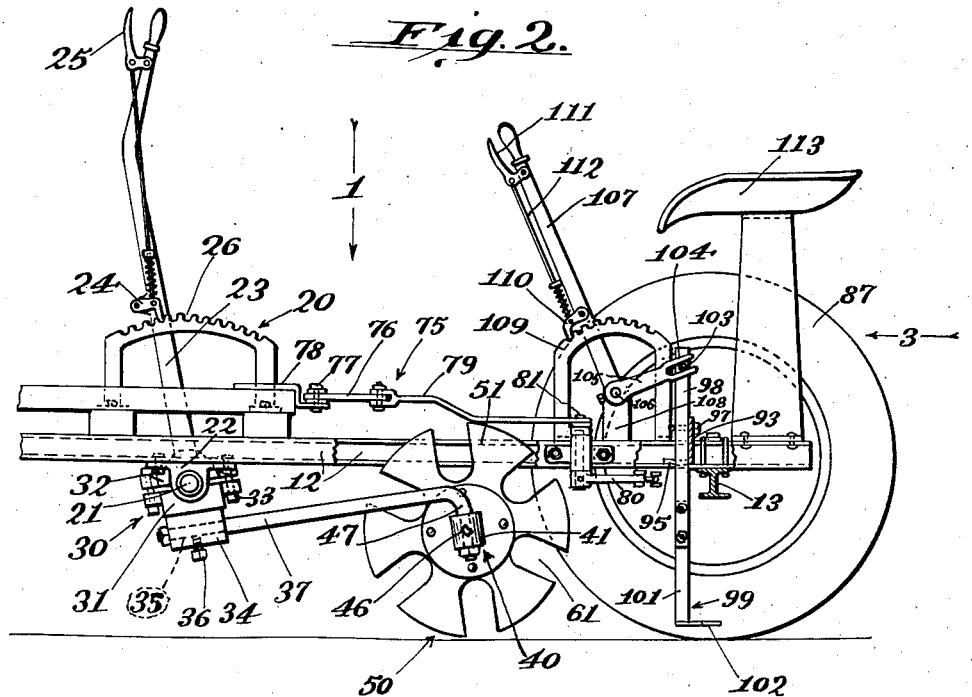
Figure 2 is a side elevation partly broken away taken in the direction of the arrow 2 of Figure 1.
Figure 3:
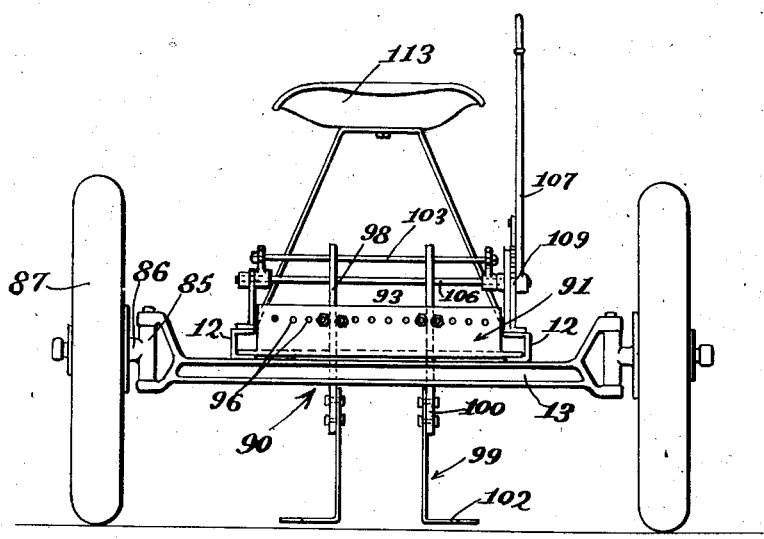
Figure 3 is a rear elevation taken in the direction of the arrow 3 of Figure 2.

A cultivating device which may also straddle a row of plants is indicated by the assembly numeral 90. This employs an angle bar 91 secured transversely of the frame of the machine and being indicated as slightly forward of the axle 13. This angle has a vertical flange 93 and a horizontal flange 94. The horizontal flange has a series of notches 95 and the vertical flange has a series of bolt holes 96 through which the U shaped clamp bolts 97 extend. Vertical rods 98 are engaged by these clamping bolts and extend downwardly through a notch 95. To the bottom of these rods 98 are connected cultivating tools 99, these being bolted at their upper ends 100. A satisfactory tool for the purpose has a vertical stem 101 and a horizontal blade 102, at right angles to the stem, the blade extending rearwardly at an angle as illustrated in Figures 1 and 2.

The cultivating tools are regulated in heighth by employing a transverse rod 103 attached to the upper end of each of the rods 98. The ends of this rod are engaged by a yoke 104 in lifting arms 105. These arms are rigidly connected to a rock shaft 106 which is operated or rocked by the hand lever 107 attached to the rock shaft, the rock shaft being mounted on a journal box 108. A toothed quadrant 109 is engaged by the latch dog 110 manipulated by the finger grip lever 111 through the medium of the link 112 in a manner well known in the art. Therefore, the operator sitting in the seat 113 may readily control the depth of cut made by the cultivating tools or implements 99. These implements may be adjusted a desired distance apart to straddle the row of plants which are being thinned and have a dual function of cutting any weeds or other growth adjacent a row of plants on opposite sides and also levelling or smoothing the soil on opposite sides of the row where this has been disturbed by the operation of the main thinning disc 51.

Various changes may be made in the details of the construction without departing from the spirit or scope of the invention as defined by the appended claims.

I claim:

1. A plant thinner comprising in combination a vehicle having means whereby such vehicle may be moved longitudinally of a row of plants, an arm pivotally mounted on the vehicle, a dished disc rotatably mounted on the arm, said disc having a series of notches whereby the peripheral edge of the disc which forms a cutting edge has a series of interruptions, means on the vehicle to pivot the arm whereby the disc cuts into the soil adjacent the ground level, the peripheral edge of the disc being adapted to cut plants in the row and the notches being adapted to permit passing of the disc without cutting plants engaging in the notches.

2. A plant thinner as claimed in claim 1, the vehicle being mounted on steering wheels and means to actuate said wheels whereby the disc may follow a row of plants.

3. A plant thinner comprising in combination a vehicle having a frame, a transverse rock shaft mounted therein, a supporting arm adjustably mounted as to the rock shaft for rotation on the axis of the arm, a stub axle adjustably connected to the free end of the arm whereby the axle may be positioned at different inclinations relative to the arm, a dished disc rotatably mounted on the axle, said disc having a series of notches whereby its peripheral cutting edge has a series of interruptions, means to actuate the rock shaft to raise and lower the arm and hence the disc whereby as the vehicle is moved along a row of plants the disc may cut into the soil slightly below the ground level and the cutting edge of the disc sever the plants engaged thereby, the said notches leaving certain plants uncut.

4. A plant thinner as claimed in claim 3, a small disc adjustably mounted to rotate around the stub axle, one or more closure blades extending outwardly from the small disc and adapted to be brought into or out of registry with one or more of the notches of the first mentioned disc, the said closure blade or blades when in registery with one or more of the notches having an outer edge forming in effect a continuation of the cutting edge of the first mentioned disc.

5. A plant thinner as claimed in claim 3, the vehicle having steering wheels, a double lever pivoted to the vehicle frame and a connection from the double lever to the wheels for steering said wheels whereby the thinning disc may follow the line of a row of plants.

6. A plant thinner comprising in combination a vehicle frame, a transverse rock shaft journalled in said frame, a longitudinally extending arm rotatably connected to the rock shaft, the said connection intersecting the rock shaft at substantially right angles, a stub axle connected to the end of the said arm, a thinning disc mounted on said axle, the rocking of the shaft being adapted to raise and lower the disc in reference to the ground level and the rotation of the arm in its adjustment to the rock shaft being adapted to change the inclination of the stub axle with reference to the ground level.

7. A plant thinner as claimed in claim 6, the stub axle having a collar, the said collar being adjustably mounted on the end of the arm for rotation of the stub axle on the axis of the said collar.

8. A plant thinner as claimed in claim 6, the said disc being concave on one side and having a sleeve on such concave side, the sleeve being mounted on the stub axle, a ring fitted over the said sleeve and dished to conform to the concave shape of the disc, the disc having a peripheral cutting edge with a series of radial notches, the said ring having one or more blades extending radially therefrom and means to adjust the ring on the disc to form a closure for one or more of the said notches, each blade having an outer edge in alignment with the peripheral cutting edge of the disc.

9. In a plant thinner having a vehicle frame, a stub axle, means to adjustably connect said axle to the frame, a first dished disc rotatably mounted on the stub axle, the said disc being concave on one side and having a sleeve on such side journalled on the stub axle, the disc having a peripheral cutting edge interrupted by one or more radial notches, a ring fitted over the said sleeve and shaped to conform to the concave side of the disc, one or more blades extending radially from the ring and also shaped to conform to the concave side of the disc, each blade having an outer edge coincident with the periphery of the disc, a pin and slot adjusting means between the ring and the disc to adjust the blade or blades to form a closure for one or more of the said radial notches.

LEONARD G. BROTZMAN.